(12) United States Patent
Park et al.

(10) Patent No.: US 7,751,346 B2
(45) Date of Patent: Jul. 6, 2010

(54) APPARATUS FOR SEARCHING TCP AND UDP SOCKETS

(75) Inventors: Chan-Ho Park, Daejon (KR); Seong-Woon Kim, Daejon (KR); Myung-Joon Kim, Daejon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 704 days.

(21) Appl. No.: 11/605,801

(22) Filed: Nov. 29, 2006

(65) Prior Publication Data
US 2007/0088854 A1 Apr. 19, 2007

(30) Foreign Application Priority Data

Dec. 1, 2005  (KR) ............... 10-2005-0116121
Jul. 25, 2006  (KR) ............... 10-2006-0069952

(51) Int. Cl.
*H04L 12/28* (2006.01)
(52) U.S. Cl. .................. 370/256; 370/408
(58) Field of Classification Search .............. None
See application file for complete search history.

(56) References Cited

U.S. PATENT DOCUMENTS

| | | | | |
|---|---|---|---|---|
| 5,802,366 | A * | 9/1998 | Row et al. | 709/250 |
| 6,178,414 | B1 * | 1/2001 | Beckmann et al. | 707/3 |
| 7,007,101 | B1 * | 2/2006 | Schwaderer | 709/238 |
| 7,411,927 | B1 * | 8/2008 | Bhalla et al. | 370/331 |
| 7,443,839 | B2 * | 10/2008 | Bouthemy et al. | 370/352 |
| 7,480,302 | B2 * | 1/2009 | Choi | 370/395.32 |
| 7,599,323 | B2 * | 10/2009 | Chandranmenon et al. | 370/328 |
| 2002/0151315 | A1 * | 10/2002 | Hendrey | 455/466 |
| 2002/0163919 | A1 * | 11/2002 | Hu et al. | 370/400 |
| 2003/0115358 | A1 * | 6/2003 | Yun | 709/238 |
| 2004/0246974 | A1 | 12/2004 | Gyugyi et al. | |
| 2005/0066040 | A1 * | 3/2005 | Borella et al. | 709/228 |
| 2005/0182841 | A1 | 8/2005 | Sharp | |

FOREIGN PATENT DOCUMENTS

| KR | 1020000062144 | 10/2000 |
|---|---|---|
| KR | 1020050036794 | 4/2005 |

* cited by examiner

*Primary Examiner*—Jayanti K Patel
*Assistant Examiner*—Hooman Houshmand
(74) *Attorney, Agent, or Firm*—Ladas & Parry LLP (57) ABSTRACT

An apparatus for searching a socket ID of a received packet in a transmission control protocol (TCP) and a user datagram protocol (UDP) is provided. The apparatus includes: a master module, a branch table module and a tree table module. The master module analyzes command information from a processor, transfers commands to the branch table module and to the tree table module, receives results from the branch table module and from the tree table module, and reports the received results to the processor. The branch table module receives commands from the master module and manages a branch table by using only the lower 10 bits of a simple internet protocol (IP) address of the commands. The tree table module is coupled to the master module and to the branch table module, in which the tree table module manages a binary tree.

8 Claims, 10 Drawing Sheets

APPARATUS FOR SEARCHING TCP AND UDP SOCKETS

FIELD OF THE INVENTION

The present invention relates to an apparatus for searching a socket ID of a received packet in a transmission control protocol (TCP) and a user datagram protocol (UDP); and, more particularly, to an apparatus for searching TCP and UDP sockets to process a packet in a TCP offload engine using hardware for TCP acceleration.

DESCRIPTION OF RELATED ARTS

Transmission control protocol (TCP) is a connection based protocol that allows two parties to communicate with each other through connecting a port of a host and a port of a remote device, and discriminates it as a socket. That is, a socket is composed of a source IP, a destination IP, a source port, and a destination port. After forming a socket, communication in this connection exhibits characteristics that are discriminated from other sockets. The characteristics may be a window size, a maximum segment size, and a block which is defined as TCP control block (TCB), and a connection control block (CCB). Hereinafter, this block refers as a socket resource block.

If a packet is received, a related socket is searched based on an IP and a port data from a header of the received packet. Then, a socket resource block is read from the socket ID, and the packet is processed according to the socket ID. However, as the number of sockets increases then the requisite time needed to search for a particular socket ID increases.

Up to now, the protocol process is generally performed in a central processing unit (CPU). That is, the CPU performs the protocol process in software manner, and searches the socket using a Hash function generally.

Most TCP offload engines have been developed to reduce the load of the CPU by having a processor that searches sockets using a Hash function. If the number of sockets that are connected becomes excessively large, then a large number of these sockets may have the same Hash function value. As a result, the processor may take an excessive amount of time to perform the search and thus compromise the operational performance characteristics of the TCP offload engine.

As a conventional technology, the Alacritech company introduced a TCP offload engine (TOE) that identifies a slow path and a fast path, and uses a Hash function and a cache for quick searching in case of the fast path. However, it allows only four sockets to have the same Hash function. That is, it cannot search all sockets.

SUMMARY OF THE INVENTION

It is, therefore, an object of the present invention to provide an apparatus for searching TCP and UDP sockets in order to quickly process related protocol through using a binary search algorithm to reduce a socket search time in hardware that allows ten thousand sockets to be searched, embodying the binary search algorithm as hardware to search the sockets quickly, and fully supporting functions for managing a binary tree in case of TCP and UDP, such as create, delete, search and listen/connect, for reducing a time of searching a socket ID.

In accordance with an aspect of the present invention, there is provided an apparatus for searching sockets of a transmission control protocol (TCP) and a user datagram protocol (UDP), including: a master managing unit for analyzing command information from a processor, transferring a command to a branch table managing unit and a tree table managing unit, receiving results from the branch table managing unit and the tree table managing unit, and reporting the received results to the processor; a branch table managing unit for receiving a command from the master managing unit and managing a branch table; and a tree table managing unit for managing a binary tree.

BRIEF DESCRIPTION OF THE DRAWINGS

The above and other objects and features of the present invention will become better understood with regard to the following description of the preferred embodiments given in conjunction with the accompanying drawings, in which.

Detailed Description of the Invention

Hereinafter, an apparatus for searching TCP and UDP sockets will be described in more detail with reference to the accompanying drawings.

Figure 1:
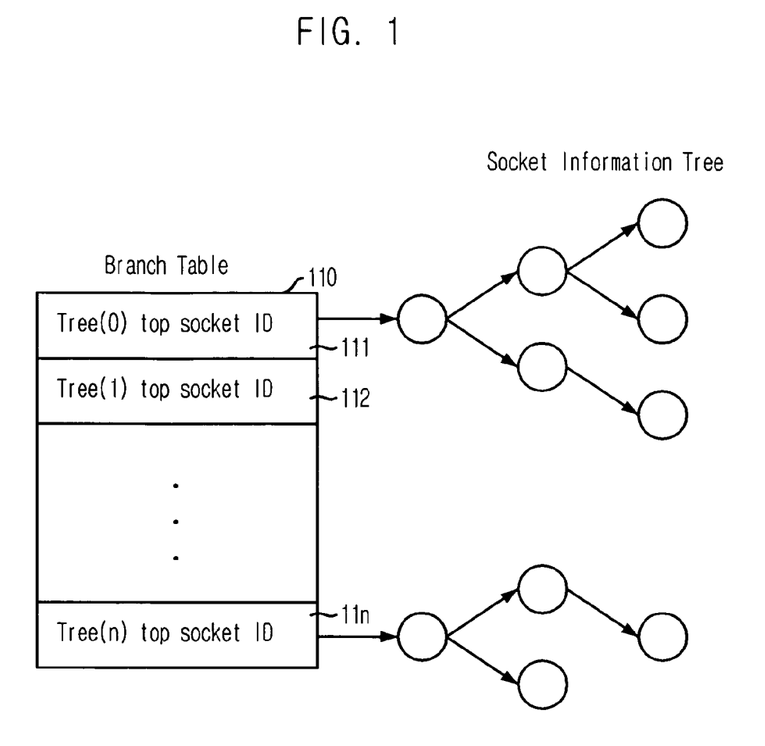
FIG. 1 is a diagram for describing an apparatus for searching TCP and UDP sockets in accordance with an embodiment of the present invention.

FIG. 1 is a diagram for describing an apparatus for searching TCP and UDP sockets in accordance with an embodiment of the present invention. Particularly, FIG. 1 shows a binary tree scheme as a search algorithm for managing memory.

In the present embodiment, a binary tree scheme is used as a search algorithm.

When a receiver receives a TCP packet, the TCP packet generally includes information about a source port, a destination port, a source IP, and a destination IP.

The socket ID is generally comprises four types of information. Since the destination IP is generally the destination IP of itself, then the socket ID is searched using only the other three types of information. Or, in a view of a receiving TCP offload engine (TOE), since the source IP is generally the source IP of itself, then the socket ID is searched using only the other three types of information in the received TCP packet.

In case of TCP, if the socket ID is operated as a server, then packets may be stored in a waiting queue until a connection is completely established. In this case, a destination port is the only information. Or, a source port is the only information in a view of a receiving TCP offload engine (TOE). The destination port may overlap with a completely connected socket.

Therefore, it requires the completely connected socket to discriminate from others.

A TCP offload engine (TOE) according to the present embodiment manages total 1,026 trees for efficiency. These trees include one tree for a UDP socket, one tree for a TCP waiting queue, and the other 1024 trees for TCP sockets.

As shown in FIG. 1, a branch table 110 contains socket IDs 111 to 11n included in a root of each tree.

The branch table 110 functions as a Hash table.

Since the UDP socket tree and the TCP waiting queue tree comprise only one entity each, then they do not require a reference to divide their respective trees. In case of TCP, a Hash function is required as a reference to divide the 1024 TCP socket trees. Many Hash functions have been introduced. It is preferable to select one that has comparative uniform distribution among them for improving the performance thereof.

In the present embodiment, lower 10 bits of a simple IP are used as the index of a branch table 110.

Hereinafter, the reason of using 10 bits of index to create the branch table 110 will be described.

If the sockets are classified by using the Hash function, then the binary search time can be further reduced in comparison with using only one root. Furthermore, if the sockets are classified by using the Hash function, then the space for storing information can be reduced too.

Since the TCP offload engine (TOE) according to the present embodiment assumes ten thousand connections C10K, 10240 spaces are required to store current sockets.

Since information about a source port, a destination port, and a destination IP are required for searching a socket ID, then a total of 64 bits are required to store the information.

For convenience, a host port refers to its an own port number, a remote port refers to a remote port number, and a remote IP refers to a remote IP.

Since 14 bits are required for expressing 10240 socket IDs and a high pointer and a lower pointer are required for managing a binary tree, 28 bits are required. Therefore, 92 bits are required for one socket.

Since 10240 socket spaces are required, total 92×10240 bits are required as a storing space for managing the entire tree.

If a predetermined part is cut off from the 64-bit information and the cutoff part is used as an index of the branch table 110, it can save the storing space for managing the entire tree as much as the cutoff part. That is, a space for the branch table 110 can be expanded.

If the number of bits of the cutoff part is n, the storing space for managing the tree can be saved as much as total 10240×n bits, and the expanded space of the branch table 110 is $2^n \times 14$ bits. Therefore, the savable storing space can be expressed as a function in Eq. 1.

$$Y=10240n-14 \times 2^n \qquad \text{Eq. 1}$$

Since the function of Eq. 1 has the maximum value when n=10, the branch table 110 can be formed using a 10-bit index.

Figure 2:
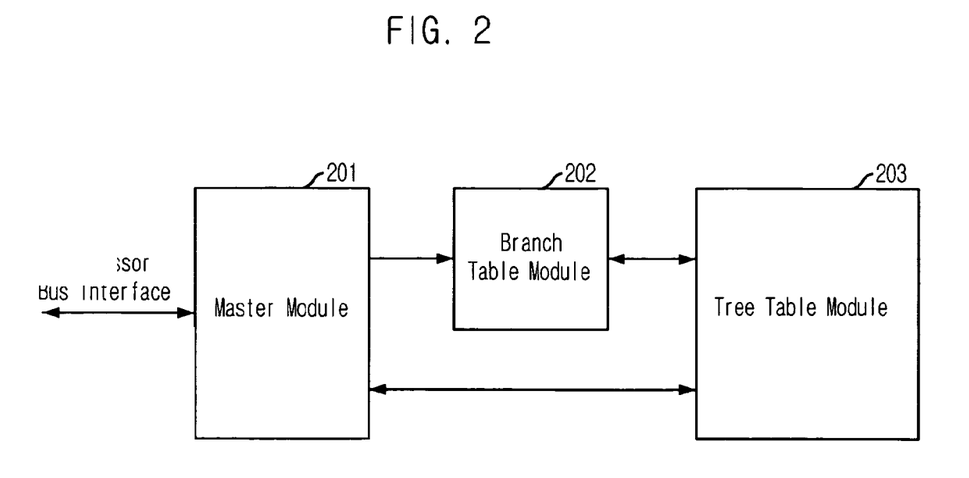
FIG. 2 is a block diagram illustrating an apparatus for searching a TCP socket and a UDP socket in accordance with an embodiment of the present invention.

FIG. 2 is a block diagram illustrating an apparatus for searching a TCP socket and a UDP socket in accordance with an embodiment of the present invention.

Referring to FIG. 2, the apparatus for searching a TCP socket and a UDP socket according to the present embodiment includes a master module 201, a branch table module 202, and a tree table module 203. The master module 201 is connected to a processor. The master module 201 receives command information from the processor and a command register and transfers that to other modules. Also, the master module 201 receives results from the other modules and reports the result to the processor. The branch table module 202 manages the branch table. The tree table module 203 manages a binary tree.

The master module 201 includes a processor interface.

The master module 201 includes a command and result register connected to two processor buses for receiving commands and transmitting results.

The master module 201 receives commands from the processor and transfers them to the other modules. The master module 201 also transfers information received from the command processor. The master module 201 receives results from the other modules and reports the result to the processor.

The branch table module 202 manages the above described branch table. The tree table module 203 manages a binary tree.

The certain embodiment of the present invention provides an embodying method for quickly searching sockets in a design of TCP offload engine (TOE) for accelerating a TCP protocol.

The socket searching apparatus according to the present embodiment is designed to be used in a TCP offload engine (TOE) processing a protocol using two transmitting and receiving processors.

Although a socket search function is performed in the receiving processor, a function for inputting data to search-hardware for enabling the socket search is performed by the transmitting processor. Also, the apparatus for searching the TCP and UPD socket according to the present embodiment is designed to participate in generating sockets in order to easily find a socket resource block using a socket ID when the transmitting processor communicates with a host processor.

In general, the TCP offload engine (TOE) mainly processes a TCP protocol. However, a UDP protocol also has a socket using a port number. The socket searching apparatus according to the present embodiment also has a function of searching the UDP socket to allow the TOE to process the UDP protocol. The socket searching apparatus according to the present embodiment can search even a server socket in a TCP listen state, thereby providing an environment that allows a TCP offload engine to control almost of all TCP connections.

Figure 3:
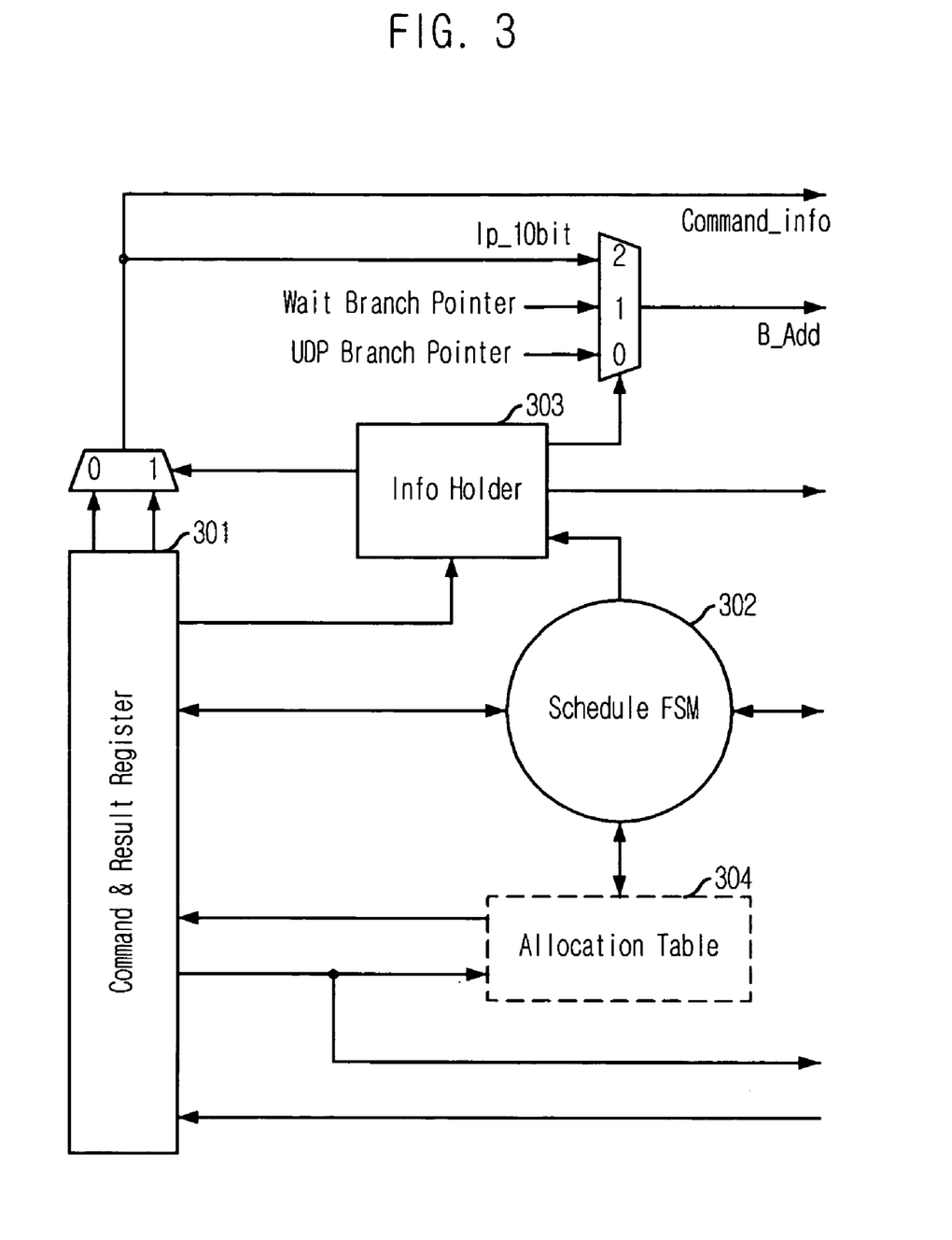
FIG. 3 is a diagram illustrating a master module shown in FIG. 2.

FIG. 3 is a diagram illustrating a master module shown in FIG. 2.

As shown in FIG. 3, the master module includes a command and result register 301, a schedule finite state machine (schedule FSM) 302, an info holder 303, and an allocation table 304. The command and result register 301 stores command information from the processor by interfacing the processor. The schedule FSM 302 analyzes the received information from the command and result register 301 and requests corresponding command. The info holder 303 selects one of the command register information of a receiving processor and the command register information of a transmitting processor by analyzing the received command information, and selects an address to be used in the branch module 202. The allocation table 304 is used for allocating an address in response to a location allocation request from the schedule FSM 302.

The command and result register 301 is a register set that interfaces with the transmitting processor and the receiving processor.

Figure 4:
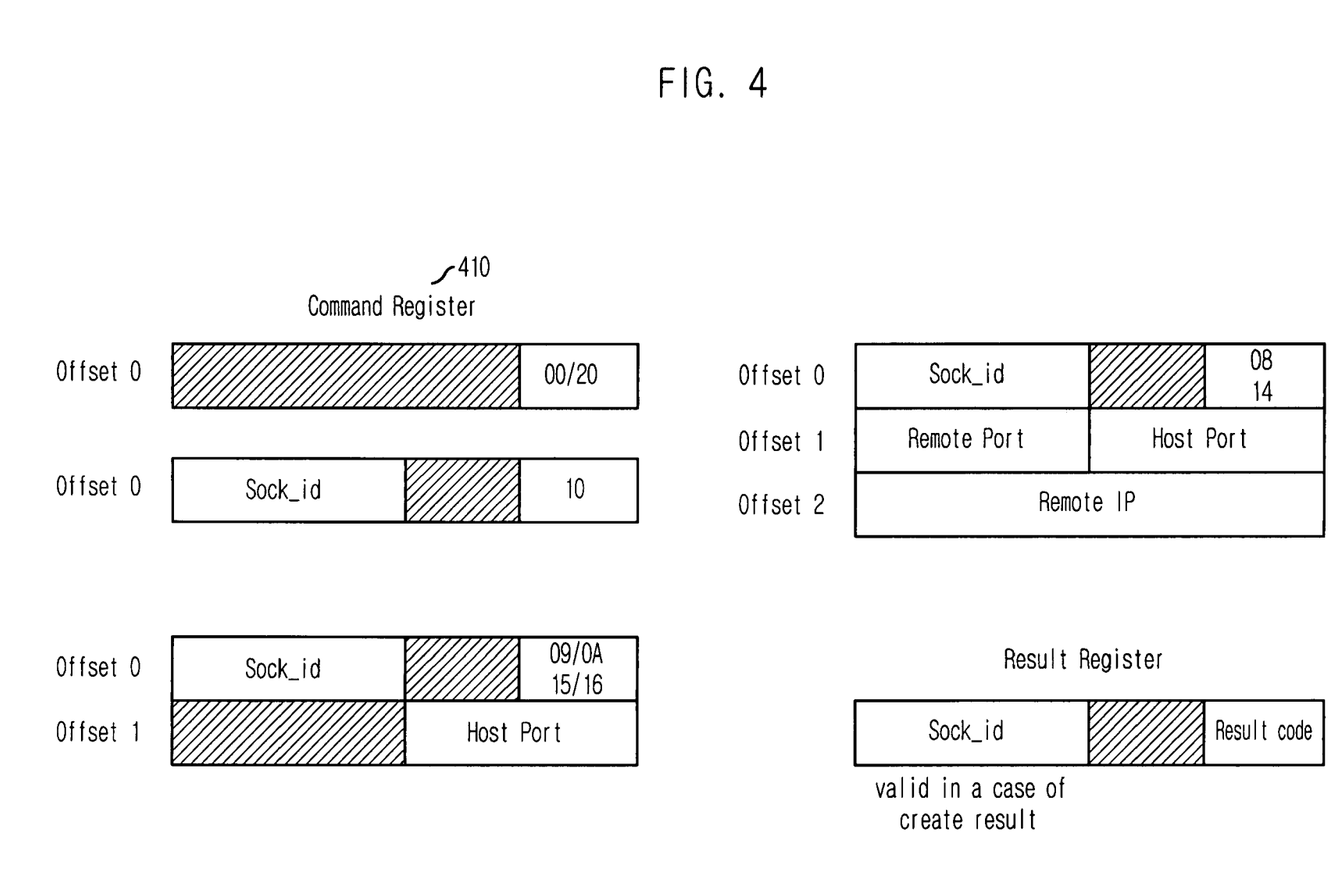
FIG. 4 is a diagram illustrating a register set used in a transmitting processor in accordance with an embodiment of the present invention;.

FIG. 4 is a diagram illustrating a register set used in a transmitting processor in accordance with an embodiment of the present invention.

Figure 5:
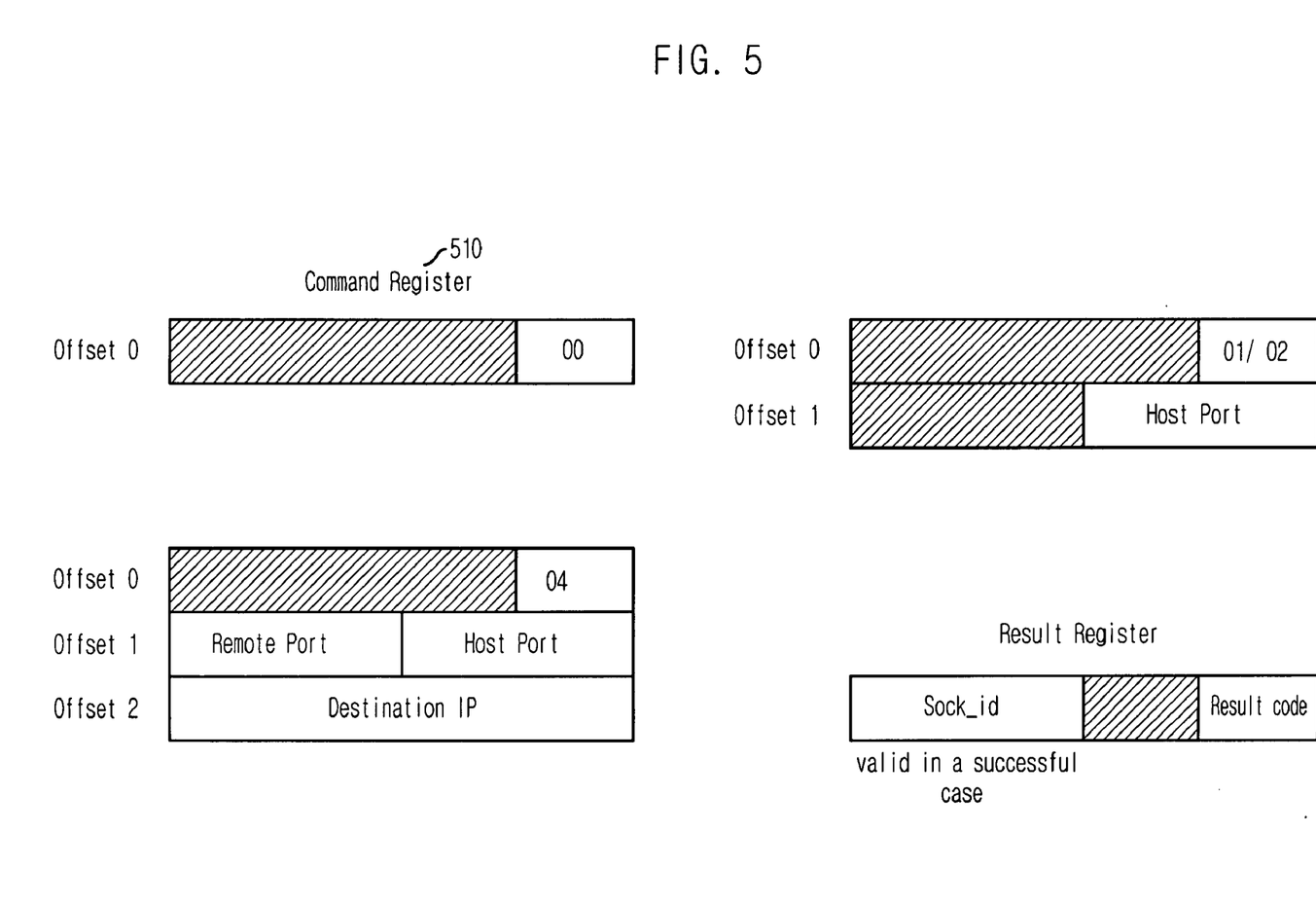
FIG. 5 is a diagram illustrating a register set used in a receiving processor in accordance with another embodiment of the present invention.

FIG. 5 is a diagram illustrating a register set used in a receiving processor in accordance with another embodiment of the present invention.

Hereinafter, the master module 201 will be described with reference to FIGS. 3 to 5 in detail.

Lower 8 bits of an offset 0 in each command register 410 and 510 is used as a command code.

According to TCP/UDP, several steps such as creating, operating and terminating packets are performed to establish a communication between two parties.

In TCP/UDP, sockets are processed through several steps from creation to deletion as follows.

At first, in the UDP, sockets are processed in an order of steps of create, bind, packet transceiving, and delete.

The create step creates a socket.

The bind step allocates a port to a socket. The packet transceiving step transmits and receives packets. The delete step deletes the socket.

In case of TCP, sockets are differently processed according to a server or a client.

The create step and the bind step are performed identically in both cases. After the bind step, a listen step and an accept step are performed in case of a server. In case of a client, a connect step is performed after the bind step.

Then the packet transceiving step is performed in both cases, and the sockets are deleted by the delete step.

A "Create" is a command to request a system to handle a socket to use.

In general, it is not identical to a socket ID used in the system. However, the socket searching apparatus according to the present embodiment receives a command "Create" and returns an available value among 0 to 10239 in order to return it to user as a handle of a socket. That is, the used handle of socket becomes a socket ID when a user gives a command, and it can be used as an index to bring a socket resource block without any transform.

In this case, a tree structure does not change.

The allocation table 304 of FIG. 3 enables the command "Create" to be processed.

The command and result register 301 analyzes the schedule FSM 302 when the command "Create" is received, and requests the allocation table 304 to allocate a space.

After receiving a request of allocation, the allocation table 304 outputs a small value among available values from 0 to 10239, or outputs a message of "no more space available".

In case of outputting a value, the output value is recorded in the command and result register 301, and the transmitting processor uses this value as a socket ID.

The allocation table 304 is hardware embodied to function similar to a file allocation table of an operating system. The allocation table 304 can allocate location in high speed although it allocates one location at one time.

When a bind function is called in UDP, the UDP enters a normal operating state. Therefore, it requires socket information to be added in a tree structure using a host port number to enable the socket search when a packet is received. Herein, one tree is used for UDP, e.g., command code 0X09. Another wait tree is used for a socket of a TCP wait state, e.g., a command code 0X04.

In case of TCP, although the bind function is called, the TCP is not in the normal operating state yet.

In case of a client, the remote IP and port number become known by calling a connect function. If the connect function is called, socket information is added in to a tree structure using a remote IP, a remote port number, and the client's port number. Herein, a tree having a root index made of the lower 10 bits of the remote IP is used among 1024 TCP trees. (For example, a command code 0X08 of FIG. 4).

In case of a server, a listen function is called. When the listen function is called, a corresponding socket is entered into a wait state. Herein, a remote IP and port number are unknown. However, the remote IP and port number are searched using the remote's own port number in a received packet. Therefore, socket information is added in a tree structure using the remote's own port number.

When a connection request packet is received from remote device, the remote ID and port number are known. The information of the received packet is transferred to a transmitting processor for the uniformity of operations, and the transmitting processor adds the corresponding socket information to a tree structure. The transmitting processor creates information for one new socket. Then, the transmitting processor adds the new information of the socket to one of 1024 TCT wait trees using the remote IP and port number.

The socket in the wait tree is used to process newly received connection request packets until a delete command is received from a user.

When a user requests a socket to be deleted, a corresponding node is deleted from a tree structure storing the socket information. Then, the allocation table 304 releases the socket ID from the allocated space. Afterward, if a create command is received to undelete the socket, then the deleted socket ID can be reused.

In case of deleting a TCP socket after completely establishing a connection for the TCP socket, a command code 0x14 is used. In case of deleting a UDP socket, a command code 0x15 is used. In case of a deleting a socket in a TCP listen state, a command code 0x16 used to identity a corresponding tree and a corresponding node to delete the socket in the TCP listen state.

Although it is not general case, in case of a UDP socket without bound, or a TCP client socket without receiving a connect command, a command code 0x10 code is used to delete them from the allocation table 304 only.

The above described commands are given by a transmitting processor. When a packet is received and if the received packet is a TCP connection request packet, a socket is searched from a wait tree, for example, a command code 0x02 in FIG. 5. If the received packet is a UDP packet, a socket is searched from the UDP tree, for example, a command code 0x01 of FIG. 5. If the received packet is general TCP packet, a socket is searched from the TCP tree, for example, a command code 0x04 in FIG. 5.

The socket searching apparatus according to the present embodiment receives the command from the receiving processor, returns a socket ID for the received command, and notices the receiving processor with no socket.

The result register of the command and result register 301 includes a result code 0x02 denoting success of transmission and receipt, a result code 0x03 denoting fail, and a progress code 0x01 denoting that a related process is in progress.

In case of a result code of a transmitting processor, a socket ID field thereof has a valid value for a successful result of a create command. In case of a receiving processor, a socket ID field thereof always has a valid value to show a successful result because all commands are search commands.

The command and result register 301 receives a command from a processor and transfers the received command to the schedule FSM 302 and the info holder 303.

The schedule FSM 302 requests the allocation table 304 to perform a corresponding operation when the command is a command for creating or deleting a socket. For other commands, the schedule FSM 302 requests the tree table module 203 to perform a corresponding operation. In case of the delete command, the schedule FSM 302 may request the allocation table 304 and the tree table module 203.

The Info holder 303 selects one of the command register information of the transmitting processor and the command register information of the receiving processor based on the command information. Then, the info holder 303 determines whether a tree is searched using both of IP and port information or the tree is searched using the host port only. Such values are sustained until related processes of the command are completely performed.

Figure 6:
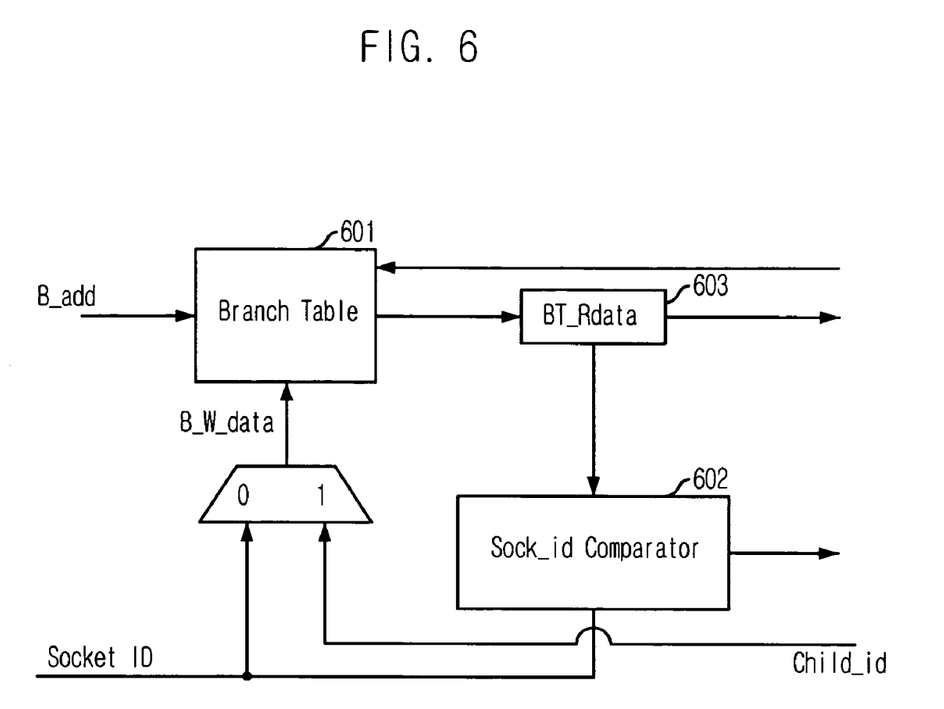
FIG. 6 is a diagram illustrating a branch table module of FIG. 2.

FIG. 6 is a diagram illustrating a branch table module of FIG. 2.

As shown in FIG. 6, the branch table 601 includes total 1026 entries as memory blocks. The value of each entry has a socket ID included in a root of a selected tree.

A "BT_Rdata" 603 is an output value of the branch table 601, which is a memory block.

A socket ID comparator 602 compares a socket ID value inputting to the command and result register 301 with the "BT_Rdata" 603 outputted from the branch table 601, determines whether the two values are identical or not, and determines whether the "BT_Rdata" 603 is null or not. 14 bits 3FF is used as the null value. All bits of the branch table 601 are initially filled with 1.

Figure 7:
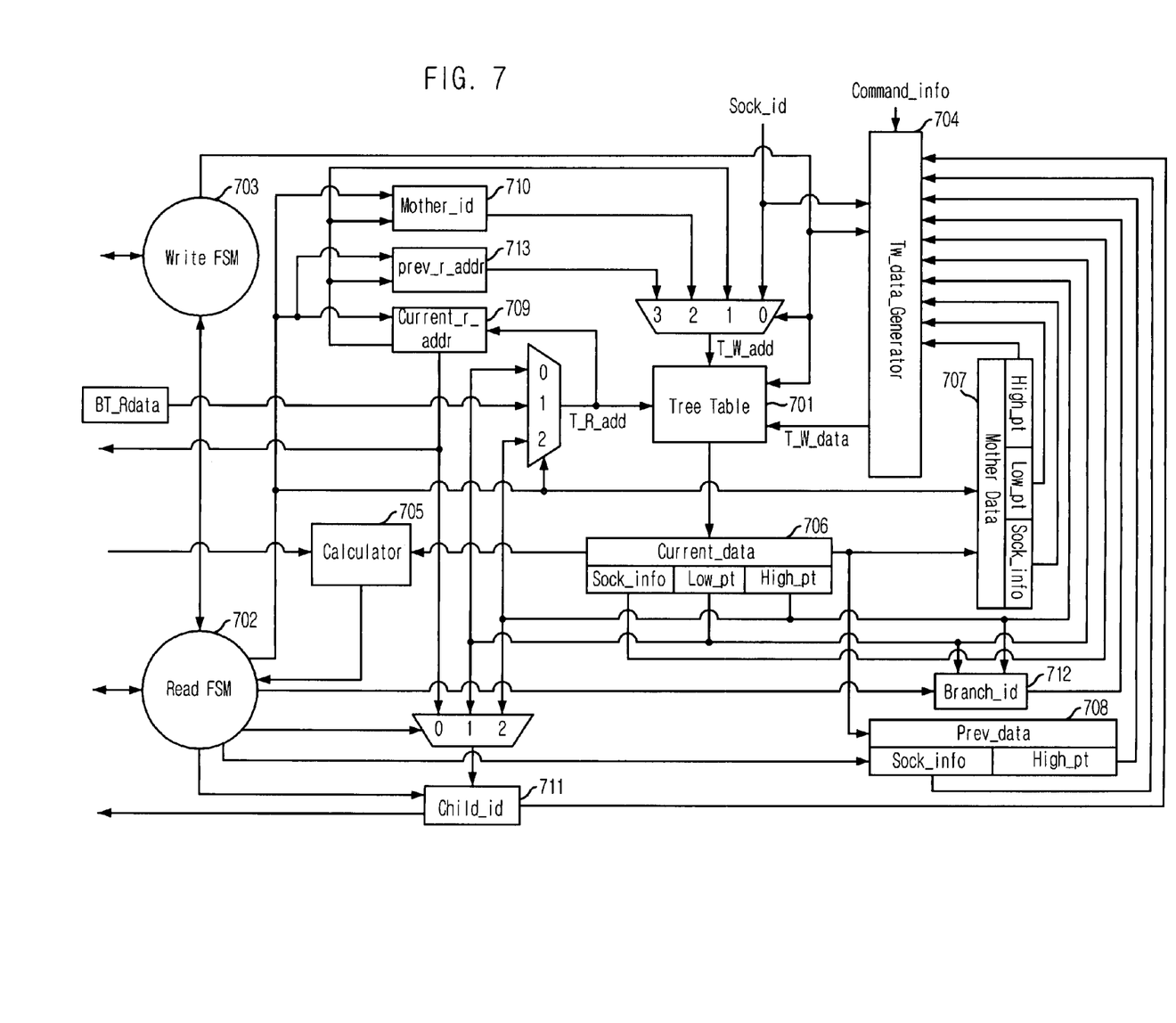
FIG. 7 is a diagram illustrating a tree table module of FIG. 2.

FIG. 7 is a diagram illustrating a tree table module of FIG. 2. That is, an internal structure of the tree table module 203, which occupies the largest portion in the present embodiment, is shown in FIG. 7.

Referring to FIG. 7, the tree table 701 is a memory block having socket information and point information of a binary tree.

A read FSM 702 and a write FSM 703 manages trees by reading and updating tree information in the tree table 701 which is a memory block.

After the read FSM 702 receives a command and finds related data, if the update is required, the write FSM 703 updates the tree information by receiving the related command.

The write FSM 703 transmits a recording request signal to the branch table 601 of the branch table module 202.

A current_data 706 is a register for temporally storing read information from the tree table 701.

A prev_data 708 is a register to store the current_data 706 again when the current _data 706 changes, and a Mother_data 707 is a register for storing the current_data value in response to command of the read FSM 702. Herein, a "sock_info" in the Mother_data 707 is 54 bit data formed of a host port, a remote port and a remote IP that is 22 bit data. It is treated as one value, and its value is compared in a binary tree.

In the Mother_data 707, a "low_pt" and a "high_pt" are pointer value of two child nodes in a tree, and the pointer value is a socket ID.

A calculator 705 informs various results to the read FSM 702 using information from the command and result register 301 and information read from the tree table 701. That is, the results are results of determining whether it identical to "sock_info", whether it is larger or smaller, whether the "low_pt" or "high_pt" is null, and whether it is identical to the socket Id of the command register.

A Tw_data_generator 704 generates a value to recorder when the tree table 701 is required to be updated. In case of search which is a command of a receiving processor, the Tw_data_generator 704 and the read FSM 703 do not participate therein.

The tree table module 203 adds a node, deletes a node, and searches a node according to a command.

The tree table module 203 adds or deletes nodes in response to a command from the transmitting processor, and searches nodes according to a command from the receiving processor. Three operations of the tree table module 203 are performed as follows. That is, data is stored in a register in order to embody the management of the binary tree in hardware.

Figure 8:
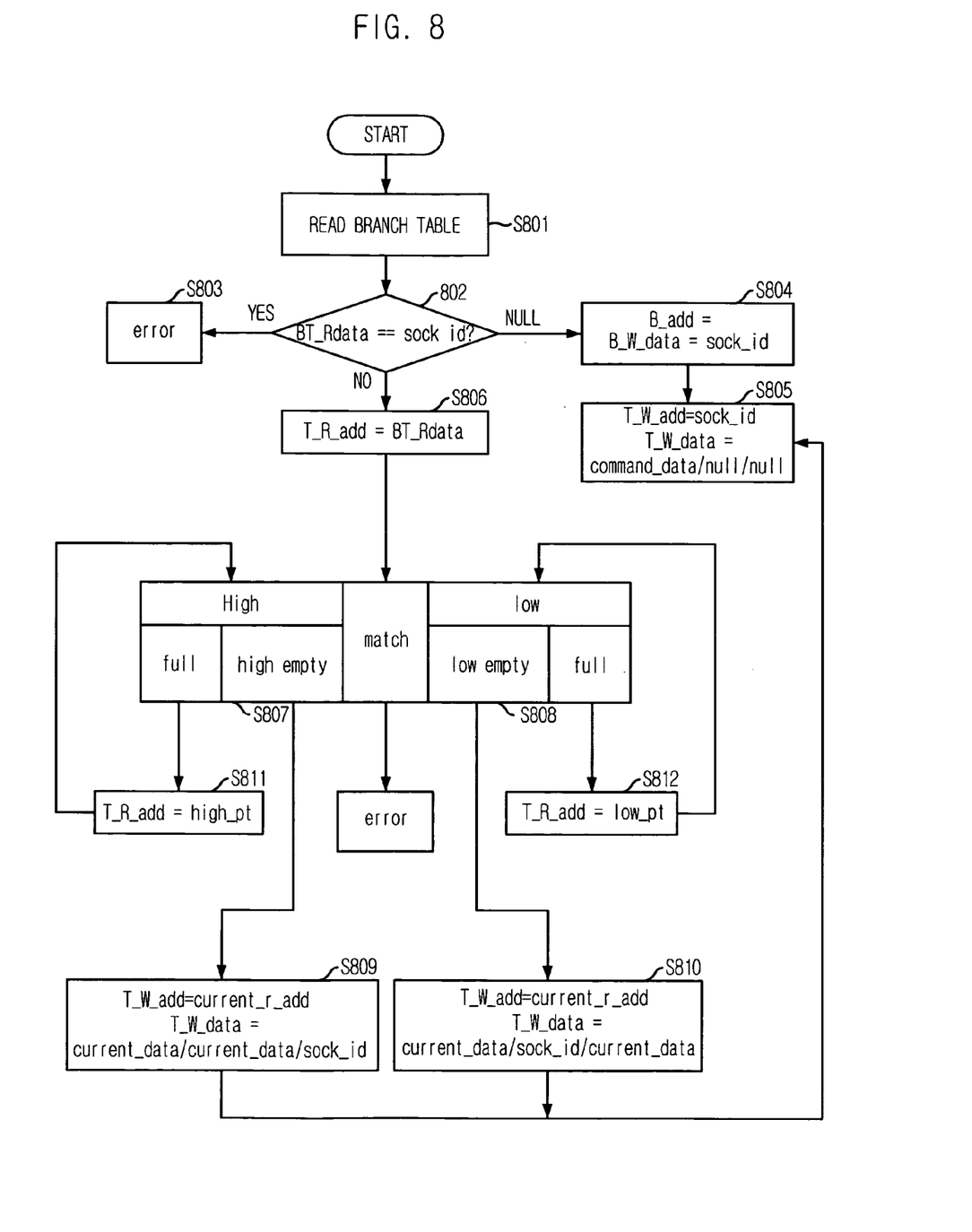
FIG. 8 is a flowchart illustrating a method of adding a tree node in a tree table module of FIG. 7.

FIG. 8 is a flowchart illustrating a method of adding a tree node in a tree table module of FIG. 7.

At step S801, a branch table (B-add) 601 reads. An address inputs as "B_add" varies according to the type of commands. That is, in case of the TCP socket, the "B_add" is lower 10 bits of the opponent IP. In case of a TCP socket in a listen state, the "B_add" is an address for a wait branch. In case of UDP, the "B_add" is an address for a UDP branch.

Then, it determines whether the read BT_Rdata is identical to a socket ID to be currently added at step S802. Normally, the read BT_Rdata cannot be identical to the socket ID to be currently added at step S803. If the read BT_Rdata is null, a socket is not stored in a current tree. Therefore, a current socket ID is stored in a corresponding address of the branch table 601 at step S804, and an initial value is recorded in a corresponding socket ID of the tree table 701 at step S805. The initial high pointer and low pointer are null. A host port number is recorded in the 54bit "Sock_Info" information, or a host port, a remote port, and a remote IP are recorded therein. Herein, an "A/B/C" format recorded in the "T_W_data" 805 denotes "Sock_Info/Low Pointer/High Pinter".

If the "BT_Rdata" is not null, a tree is searched using the value thereof. That is, "T_R_add=BT_Rdata" at step S806.

If the "Sock_Infor" value is larger than the read tree node, and if the high pointer is null at step S807, or if the "Sock_Infor" value is smaller than the read tree node, and if the low pointer is not null at step S808, a node is searched. Then, a socket ID received as a command is stored in a pointer value, and an initial value is recorded in a location of a corresponding socket ID at steps S809 and S810. If the "Sock_Infor" value is larger than the read tree node, and if the high pointer is not null at step S811, or if the "Sock_Infor" value is smaller than the read tree node, and if the low pointer is null at step S812, a search is continuously performed in a memory constituting a tree by recording a corresponding pointer in a "T_add".

When the "Sock_Info" value is compared, all 54 bit value is compared in a case of a TCP socket. For the other case, such as a UDP socket and a TCP wait sequence, only host value is compared.

In the flowchart, "empty" means that the pointer value of a child node is null, and "full" means that the pointer value of a child node is not null.

Figure 9:
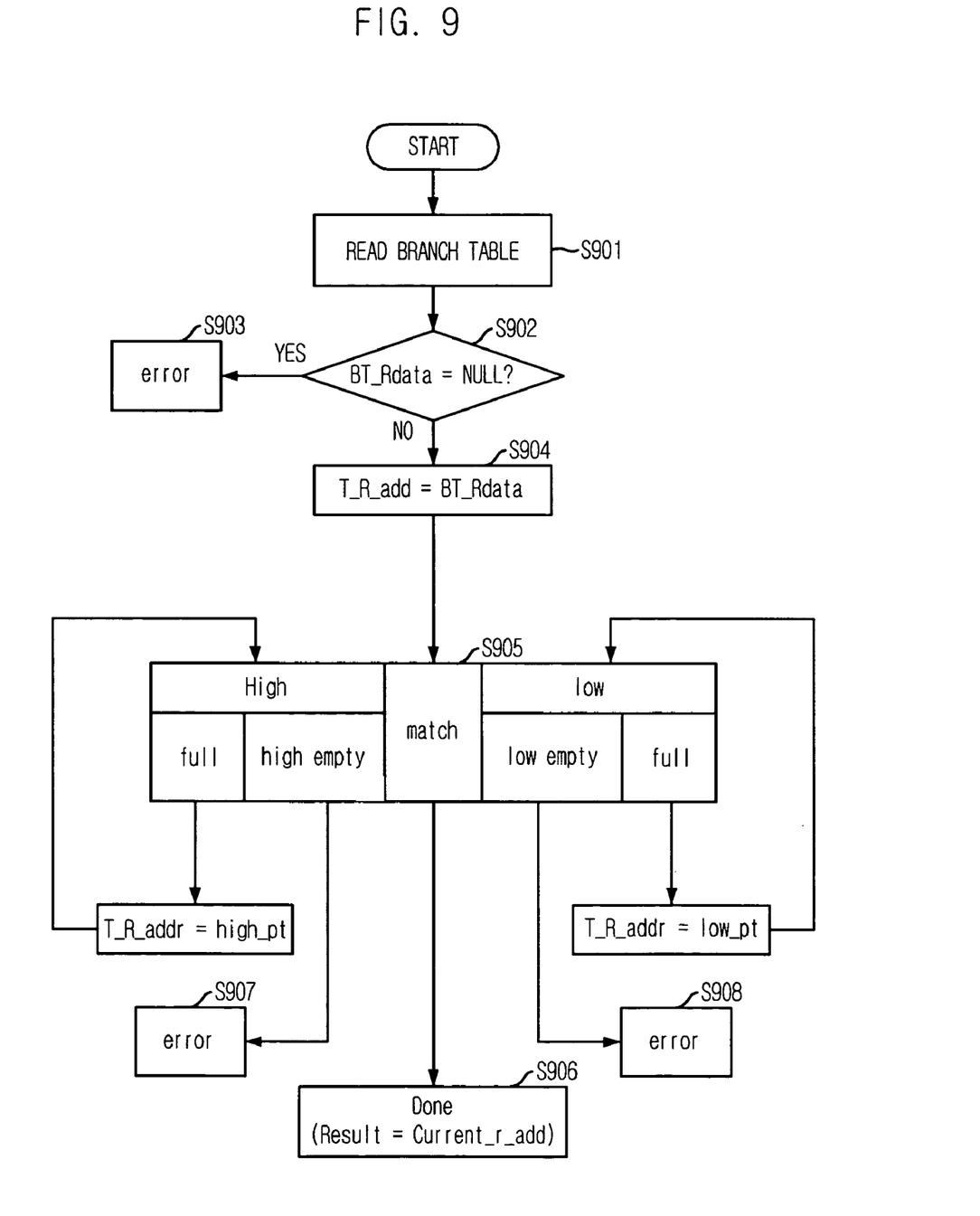
FIG. 9 is a flowchart illustrating a method of searching tree nodes in a tree table module of FIG. 7 in accordance with an embodiment of the present invention.

FIG. 9 is a flowchart illustrating a method of searching tree nodes in a tree table module of FIG. 7 in accordance with an embodiment of the present invention.

While searching the tree, the tree structure does not change.

At first, a branch table read at step S901. As described above, an input address as "B_add" varies according to a type of command. That is, the "B_add" is lower 10 bits of an opponent IP (remote IP) in case of TCP socket. The "B_add" is an address for a wait branch in case of a TCP socket. The "B_add" is an address for an UDP branch in case of a UDP socket.

Then, it determines whether a "BR_Rdata" value is null or not at step S902.

If the "BT_Rdata" value is null, it means no socket is stored in a current tree. That is, a search is fail at step S903. If it is not null, a tree is searched using the value thereof (T_R_add=BT_Rdata) at step S904.

If the read tree node is identical to the "Sock_Info" value at step S905, a currently read socket ID value 709 is returned at step S906.

If the read tree node identical to the "Sock_Infor" value cannot be searched, the search is failed at steps S907 and S908.

Figure 10A:
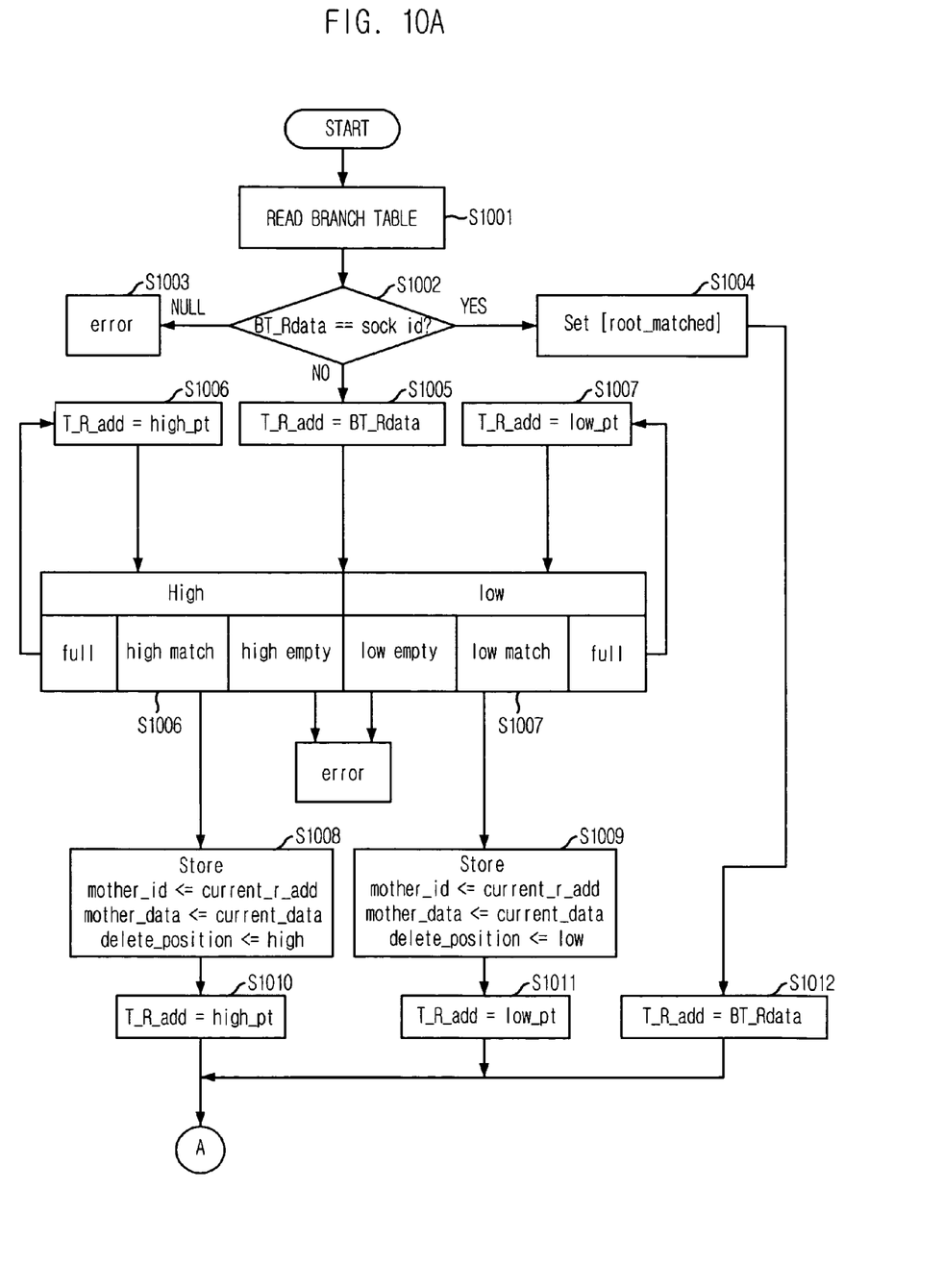
FIGS. 10A and 10B are flowcharts illustrating a method of deleting a tree node in a tree table module of FIG. 7.
Figure 10B:
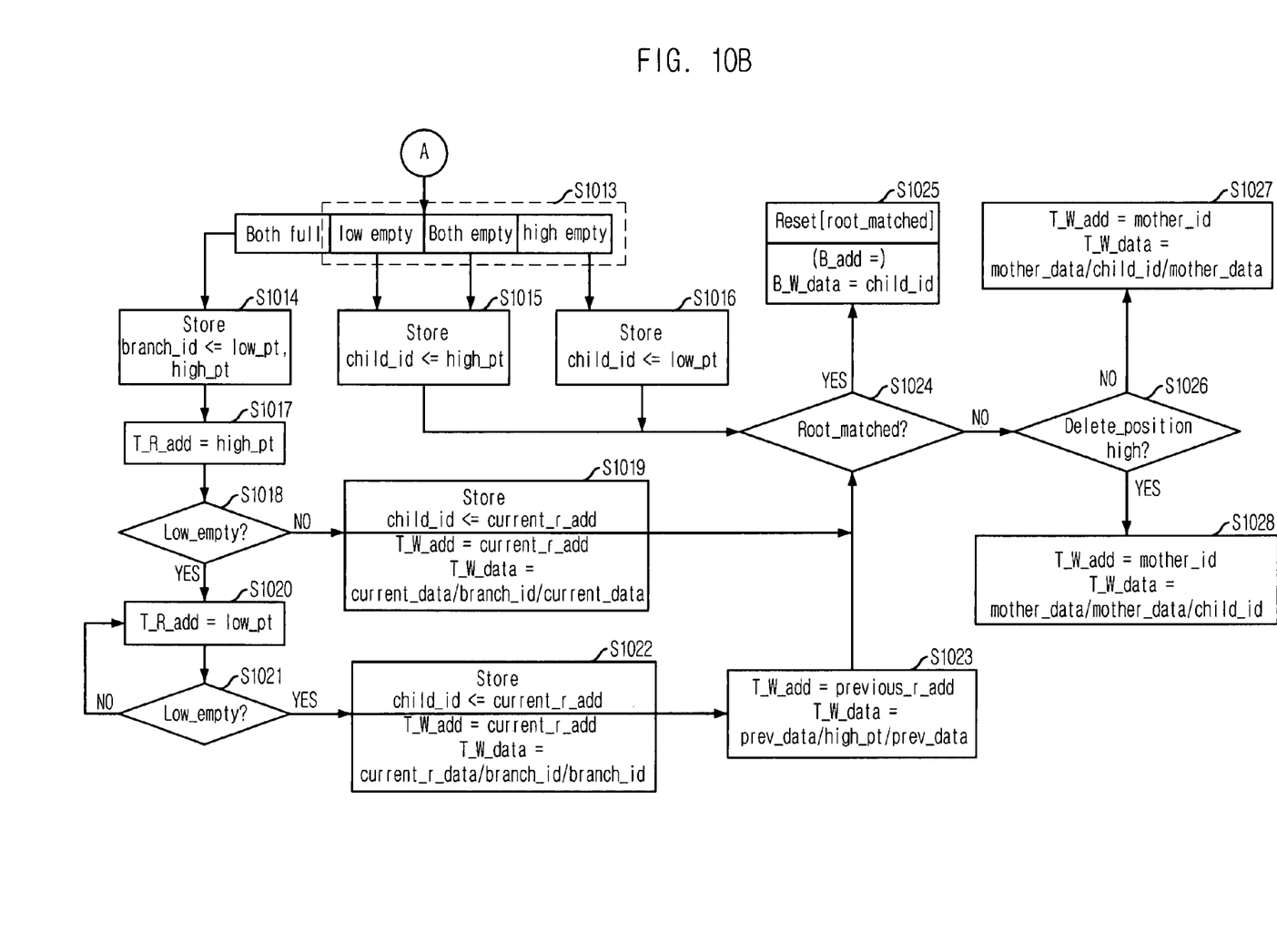

FIGS. 10A and 10B are flowcharts illustrating a method of deleting a tree node in a tree table module of FIG. 7.

At step S1001, a branch table read. Then, the "BT_Rdata" is compared to the "sock_id" at step S1002.

If the BT_Rdata value is null at step S1002, it means that no socket is stored in a current tree. That is, the deletion is failed at step S1003. If the BT_Rdata value is identical to a socket ID to delete, it marks the current tree to delete a root (Set [root_matched]) at step S1004.

Afterward, a mother node of a node to delete is searched.

A tree is searched using the value of BT_Rdata at step S1005. The socket ID is compared to a high pointer and a low pointer, beside of comparisons performed in the adding and the searching operation. If the socket ID is identical to them, a high match result and a low match result are returned at steps S1006 and S1007.

If the Sock Info value is larger than the read tree node, and if the high pointer is identical to the socket ID, or if the Sock Info value is smaller and if the low pointer is identical to the socket ID, this node is the node of the mother node to delete. In this case, the socket ID value 709 and the data thereof 706 are stored in the mother_id 710 and the mother_data 707, and it is preferable that it decides one of a low chide and a high child of the mother node to delete (delete_position <=high or low) at steps S1008 and S1009. Herein, if the BT_Rdata is already matched, it determines that the above steps are already performed.

If a node to delete does not include child nodes or includes only one child node at step S1013, the child node ID (pointer value) is stored in a child_id 711 at steps S1015 and S1016. The deletion operation can finish by connecting it to the mother node.

If a node to delete has two child nodes, one having the smallest value among the sub-trees of the high node, and one having the largest value among the sub-tress of the low node must be put into the node to delete. That is, it connects to the mother node. In the present embodiment, a tree having the smallest value from the sub-trees of the high node is put into the node to delete. Then, the child pointer of the chosen node is stored in to the brach_id 712 at step S1014 because the child pointer of the chosen node must be recorded in the child pointer of the deleted node.

Then, a high node reads at step S1017, and it searches a low node at step S1018.

If the low node is no present at step S1018, the current ID is stored in the child_id 711 at step S1019 because the searched low node is connected to the mother node. Also, the previous low pointer value stored in the branch_id 712 is connected as a low pointer.

If the low node is present at step S1018, the low node reads at step S1020, it searches a low pointer along a tree until the low node is not existed at step S1021. Since the mother node of a node not having a low node must be stored, the previous_address 713 and data 708 are stored.

If a node with no low node is searched, the ID of the searched node is stored in a child_id 711 at step S1022. Also, two pointers previously stored in the branch_id 712 are connected to a sub tree. If the node includes a high node, the high node is separated therefrom, the high node is connected to the mother node of a current node. The mother node of a current node is recorded in a Previous_r_add 713 at step S1023.

Lastly, the mother node of a node to delete is connected to a new node. If the node to delete is a root node at step S1024, the ID of a new node is recorded in the branch table at step S1025. Herein, it uses a B_add value identical to that used in reading the branch table.

If the node to delete is not the root, proper data is recorded at the Mother_id 710 according to the deleted child node is a high node or a low node at steps S1026, S1027, and S1028.

As described above, the socket searching apparatus according to the present invention quickly searches and manages many TCP and UDP sockets, for example, up to total ten thousands sockets, in hardware manner when a TCP acceleration hardware having transmitting and receiving processors is manufactured. The hardware includes function of generating and allocation sockets. Therefore, the socket searching apparatus according to the present invention allows a socket resource block to be accessed with using a socket ID from a user. Also, the socket searching apparatus performs a classification again using a Hash function before a binary search, thereby improving search efficiency and saving memories. Furthermore, the socket search apparatus can support all functions for TCP/UDP full-offloading by searching a UDP socket and a TCP socket in a listen state besides managing TCP socket information in a TcP offload engine (TOE).

The present application contains subject matter related to Korean patent application No. KR 2005-116121, and No. KR 2006-69952, filed in the Korean patent office on Dec. 1, 2005, and on Jul. 25, 2006, the entire contents of which being incorporated herein by reference.

While the present invention has been described with respect to certain preferred embodiments, it will be apparent to those skilled in the art that various changes and modifications may be made without departing from the spirits and scope of the invention as defined in the following claims.

What is claimed is:

1. An apparatus for searching sockets of a transmission control protocol (TCP) and a user datagram protocol (UDP), comprising:

a master module for analyzing command information from a processor, transferring commands to a branch table module and to a tree table module, receiving results from the branch table module and from the tree table module, and reporting the received results to the processor, wherein the master module includes:

a command and result register connected to two processor buses for receiving and storing command information from the processor;

a schedule finite state machine (FSM) for receiving command information from the command and result register, the schedule FSM for analyzing the received command information and requesting a corresponding command;

an info holder for analyzing the received command information, selecting one of command register information from a receiving processor and command register information from a transmitting processor, and selecting an address to be used by the branch table module; and an allocation table for receiving an allocation request from the schedule FSM and allocating an address value;

the branch table module coupled to the master module for receiving commands from the master module and managing a branch table by using only the lower 10 bits of a simple internet protocol (IP) address of the commands; and the tree table module coupled to the master module and to the branch table module for managing a binary tree.

2. The apparatus as recited in claim 1, wherein the branch table module includes:

a branch table having a total of 1026 entries as memory blocks, where the entry values are used for storing a socket ID value located at a root of the selected tree; and a socket ID comparator for comparing a socket ID value received from the command and result register with an output value of the branch table, determining whether the socket ID value is identical to the output value, and determining whether or not the output value is null.

3. The apparatus as recited in claim 1, wherein the tree table module performs a node adding operation, a node deleting operation, and a node searching operation according to a command, wherein the node adding operation and the node deleting operation are performed by an instruction given from a transmitting processor, and the node searching operation is performed by an instruction given by a receiving processor, wherein the node adding operation, the node deleting operation and the node searching operation are embodied in hardware manner by storing data in a register value, and deciding a read/write address of a memory block, and a write data.

4. The apparatus as recited in claim 1, wherein the master module manages connected TCP sockets, a UDP socket, and a TCP socket in a listen state, wherein the schedule FSM requests the allocation table to allocate a location when receiving a create command from the command and result register, wherein the allocation table outputs a value after receiving the allocating request, and the outputted value is recorded in the command and result register so that the transmitting processor uses the outputted value.

5. The apparatus as recited in claim 1, wherein the branch table manages root IDs of all trees using a hash function.

6. An apparatus for searching sockets of a transmission control protocol (TCP) and a user datagram protocol (UDP), comprising:

a master module for analyzing command information from a processor, transferring commands to a branch table module and to a tree table module, receiving results from the branch table module and from the tree table module, and reporting the received results to the processor;

the branch table module coupled to the master module for receiving commands from the master module and managing a branch table by using only the lower 10 bits of a simple internet protocol (IP) address of the commands; and the tree table module coupled to the master module and to the branch table module for managing a binary tree, wherein the tree table module includes:

a tree table for storing pointer information of a binary tree and socket information;

a read FSM for reading tree information in the tree table;

a write FSM for updating tree information in the tree table and managing the tree;

a current data register for temporally storing information read from the tree table;

a previous data register for storing current data again when the value of the current data register changes;

a calculator for informing the read FSM with a result value using information in a command register of the command and result register and information read from the tree table, determining whether the information of the command register is identical to socket information, or whether the information of the command register is larger or smaller than the socket information, determining whether or not a low pointer and a high pointer are null, or determining whether or not the information of the command register is identical to a socket ID of a command register; and a tree write data generator for creating a value to record when the tree table is required to be updated.

7. The apparatus as recited in claim 6, wherein an update is required after the read FSM receives a command and a search data, the write FSM update tree information in response to a command, and the write FSM requests a record signal to the branch table.

8. The apparatus as recited in claim 6, wherein a mother data register includes the socket information, a low pointer, and a high pointer, wherein the socket information is 54 bit data formed of a host port, a remote port, and a remote IP, and the socket information is compared in a binary tree, and wherein the low pointer and the high pointer denote pointer values of two child nodes, and the pointer value denote a socket ID.

* * * * *